United States Patent
Ranke et al.

(10) Patent No.: US 10,356,668 B2
(45) Date of Patent: Jul. 16, 2019

(54) HANDLING A TERMINATING CIRCUIT SWITCHED SIGNALING SERVICE TO A TERMINAL IN A MOBILE NETWORK

(71) Applicant: TELEFONAKTIEBOLAGET L M ERICSSON (PUBL), Stockholm (SE)

(72) Inventors: Karl-Peter Ranke, Herzogenrath (DE); Sven Gemski, Solna (SE); Ralf Keller, Wurselen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 666 days.

(21) Appl. No.: 14/158,366

(22) Filed: Jan. 17, 2014

(65) Prior Publication Data
US 2014/0204905 A1 Jul. 24, 2014

Related U.S. Application Data

(60) Provisional application No. 61/754,144, filed on Jan. 18, 2013.

(51) Int. Cl.
*H04W 36/12* (2009.01)
*H04W 36/00* (2009.01)
*H04W 60/00* (2009.01)

(52) U.S. Cl.
CPC ....... *H04W 36/0022* (2013.01); *H04W 36/12* (2013.01); *H04W 60/00* (2013.01)

(58) Field of Classification Search
CPC . H04W 36/00; H04W 36/0022; H04W 36/12; H04W 60/00; H04W 60/04;
(Continued)

(56) References Cited

U.S. PATENT DOCUMENTS

| 7,450,565 B2 * | 11/2008 | Suotula | H04M 7/1285 |
| | | | 370/352 |
| 2003/0027595 A1 * | 2/2003 | Ejzak | H04L 51/38 |
| | | | 455/560 |

(Continued)

FOREIGN PATENT DOCUMENTS

WO 2012045377 A1 4/2012

OTHER PUBLICATIONS

3GPP TS 23.018 V11.3.0: 3rd Generation Partnership Project; Technical Specification Group Core Network and Terminals; Basic call handling; (Release 11), http://www.qtc.jp/3GPP/Specs/23018-b30.pdf, (Jun. 2012).*

(Continued)

*Primary Examiner* — Un C Cho
*Assistant Examiner* — Rasha K Fayed
(74) *Attorney, Agent, or Firm* — Rothwell, Figg, Ernst & Manbeck, P.C.

(57) ABSTRACT

Methods, nodes, computer programs and a mobile network for handling a terminating circuit switched signaling service to a terminal in a mobile network are described. A method of handling a terminating circuit switched signaling service to a terminal in a mobile network is described. The signaling service is distinct from a call. The mobile network comprises a first control node and a second control node. The method is performed by the first control node. The method comprises receiving signaling information for terminating the circuit switched signaling service to the terminal, subsequent to the step of receiving, detecting that the terminal has requested a location update from a second control node of the mobile network, and, based on the step of detecting, forwarding the received signaling information to the second control node.

27 Claims, 7 Drawing Sheets

(58) Field of Classification Search
CPC ..... H04W 76/02; H04W 76/027; H04W 4/00; H04W 92/02; H04L 12/26; H04L 12/66; H04L 12/64; H04L 29/06; H04L 65/103; H04L 65/104; H04L 65/1016; H04L 65/1069; H04L 65/1006; H04L 2012/6486
USPC .................. 370/331, 352, 354, 356, 329
See application file for complete search history.

(56) References Cited

U.S. PATENT DOCUMENTS

| | | | | |
|---|---|---|---|---|
| 2007/0014281 | A1* | 1/2007 | Kant | H04L 29/06027 370/352 |
| 2010/0208671 | A1* | 8/2010 | Tamura | H04L 65/1073 370/329 |
| 2010/0215018 | A1* | 8/2010 | Ejzak | H04W 36/0022 370/331 |
| 2010/0240369 | A1* | 9/2010 | Law | H04W 36/30 455/436 |
| 2010/0331011 | A1* | 12/2010 | Vikberg | H04W 68/12 455/456.1 |
| 2011/0243126 | A1* | 10/2011 | Witzel | H04L 65/1016 370/352 |
| 2011/0317659 | A1* | 12/2011 | Ramachandran | H04W 36/0022 370/331 |
| 2012/0002545 | A1* | 1/2012 | Watfa | H04W 4/90 370/235 |
| 2012/0028626 | A1* | 2/2012 | Marocchi | H04L 63/104 455/422.1 |
| 2012/0039167 | A1* | 2/2012 | Swaminathan | H04W 76/16 370/225 |
| 2012/0190351 | A1* | 7/2012 | Tian | H04W 8/12 455/417 |
| 2012/0264397 | A1* | 10/2012 | Meredith | H04W 76/10 455/410 |

OTHER PUBLICATIONS

"3rd Generation Partnership Project; Technical Specification Group Core Network and Terminals; Basic call handling; Technical realization (release 11)," 3GPP TS 23.18, Jun. 2012, 298 pages.

Alcatel-Lucent et al. "Mobile Terminating Roaming Forwarding," 3GPP TSG CT4 Meeting #52, C4-110758 revision of C4-110738, Feb. 21-25, 2011, 6 pages.

China Mobile, "MT USSD Support for CSFB," 3GPP TSG WG4 Meeting #59, C4-122461, Nov. 12-16, 2012, 1 page.

Ericsson et al., "Mobile Terminating Roaming Forwarding," 3GPP TSG CT4 Meeting #51bis, C4-110038, Jan. 24-28, 2011, 2 pages.

International Search Report issued by the International Searching Authority in corresponding Application No. PCT/EP2014/050830, dated May 20, 2014, 13 pages.

* cited by examiner

HANDLING A TERMINATING CIRCUIT SWITCHED SIGNALING SERVICE TO A TERMINAL IN A MOBILE NETWORK

CROSS REFERENCE TO RELATED APPLICATION(S)

The present application claims priority benefit under 35 U.S.C. § 119(e) of U.S. Provisional Application No. 61/754,144, filed on Jan. 18, 2013, the contents of which are incorporated herein by reference in its entirety.

TECHNICAL FIELD

The present disclosure relates to telecommunications, and in particular to handling a terminating circuit switched signaling service to a terminal in a mobile network. Nodes and computer programs are also described.

BACKGROUND

In the following, an introduction for the present disclosure may be presented. Mobile Terminating Roaming Forwarding (MTRF) is a procedure which is specified in Third Partnership Project (3GPP) Technical Specification 23.018 V11.3.0 (2012-06) and which describes how to deliver a terminating call to a called terminal which changes the service area of a Mobile Switching Center (MSC) and thus is performing a location update procedure to a different MSC during the setup of the terminating call. The MTRF procedure may be applied for a circuit switched (CS) call towards a called terminal which roams in Global System for Mobile Communications (GSM) Enhanced Data Rates for GSM Evolution (EDGE) Radio Access Network (GERAN) or Universal Mobile Telecommunications System (UMTS) Terrestrial Radio Access Network (UTRAN) access, but also towards a called terminal which performs a CS fallback (CSFB) from Evolved-UTRAN (E-UTRAN) to GERAN/UTRAN/1x during the establishment of the terminating call, as it is specified in 3GPP TS 23.272 V11.3.0 (2012-12).

SUMMARY

It is an object to provide measures with which a successful handling of a terminating circuit signaling service distinct from a call to a terminal in a mobile network for a case in which the terminal performs a location update procedure to a control node distinct from another control node receiving signaling information for the terminating circuit switched signaling service is enabled in an easy and efficient way. It is also an object to provide corresponding methods, nodes, computer programs, and a corresponding system.

The objects defined above are solved by the subject-matter according to claims 1, 15, and 19, 21 and 24.

The objects defined above are also solved by a mobile network comprising the first control node according to the claim 19 and the second control node according to claim 21.

According to a first exemplary aspect, a method of handling a terminating circuit switched signaling service to a terminal in a mobile network is provided. The signaling service is distinct from a call. The mobile network comprises a first control node and a second control node. The method is performed by the first control node and comprises receiving signaling information for terminating the circuit switched signaling service to the terminal. The method comprises, subsequent to the step of receiving, detecting that the terminal has requested a location update from the second control node, and, based on the step of detecting, forwarding the received signaling information to the second control node.

According to a second exemplary aspect, a method of handling a terminating circuit switched signaling service to a terminal in a mobile network is provided. The signaling service is distinct from a call. The mobile network comprises a first control node and a second control node. The method is performed by the second control node and comprises receiving, from the terminal, a request for a location update. The method comprises, particularly subsequent to the step of receiving the request for the location update, receiving, from the first control node, forwarded signaling information for terminating the terminating circuit switched signaling service to the terminal, and terminating, based on the received forwarded signaling information, the terminating circuit switched signaling service to the terminal.

According to a third exemplary aspect, a control node for handling a terminating circuit switched signaling service to a terminal in a mobile network is provided. The signaling service is distinct from a call. The mobile network comprises the control node and another control node. The control node comprises a reception unit adapted to receive signaling information for terminating the circuit switched signaling service to the terminal. The control node comprises a detection unit adapted to, subsequent to the reception of the signaling information, detect that the terminal has requested a location update from the another control node, and a forwarding unit adapted to, based on the detection, forward the received signaling information to the another control node.

According to a fourth exemplary aspect, a control node for handling a terminating circuit switched signaling service to a terminal in a mobile network is provided. The signaling service is distinct from a call. The mobile network comprises the control node and another control node. The control node comprises a reception unit adapted to receive, from the terminal, a request for a location update. The reception unit is adapted to, particularly subsequent to the reception of the request for updating the location, receive, from the another control node, forwarded signaling information for terminating the signaling service to the terminal. The control node comprises a termination unit adapted to terminate, based on the received forwarded signaling information, the terminating circuit switched signaling service to the terminal.

According to a fifth exemplary aspect, mobile network is provided. The mobile network comprises a control node according to third exemplary aspect and another control node according to the fourth exemplary aspect.

According to a sixth exemplary aspect, a computer program is provided. The computer program, when being executed by a processor, is adapted to carry out or control a method for handling a terminating circuit switched signaling service to a terminal in a mobile network according to any of the first and second exemplary aspects.

The foregoing and other objects, features and advantages of the embodiments will become more apparent in the following detailed description of the present disclosure as illustrated in the accompanying drawings.

DETAILED DESCRIPTION

Figure 1:
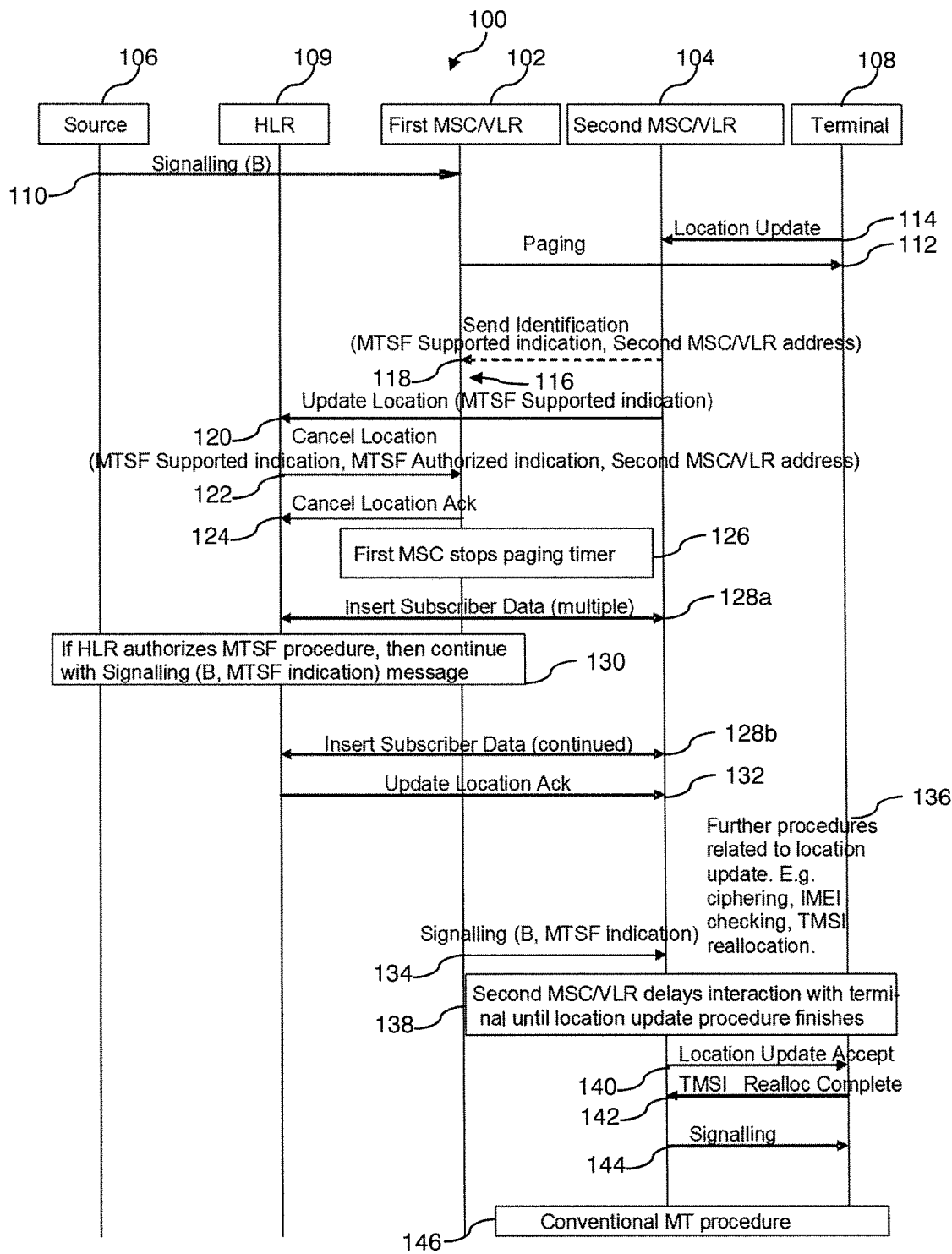
FIG. 1 is a flow diagram illustrating a method of handling a terminating circuit switched signaling service to a terminal in a mobile network according to an embodiment.

In the following, methods and devices for handling a terminating circuit switched signaling service to a terminal in a mobile network are described in more detail.

The applicant has beneficially recognized that TS 23.018 V11.3.0 (2012-06) and TS 23.272 V11.3.0 (2012-12) do not specify how to handle a terminating circuit switched signaling service to a terminal when the terminal simultaneously changes the service area of a control node and accordingly performs a location update procedure to a different control node while the request for terminating the CS signaling service is being delivered.

According to the embodiments and in particular to the exemplary aspects, in a case in which a first control node of a mobile network may receive signaling information for terminating a circuit switched signaling service distinct from a call and a terminal may perform a location update procedure to a second control node of the mobile network distinct from the first control node, a successful handling or controlling of the terminating circuit switched signaling service to the terminal may be enabled.

In particular, the described embodiments may represent a superior solution compared to an approach in which the first control node may reject the signaling information of the terminating circuit switched signaling information upon receipt of the latter. Such an approach would fit in conventional measures related to terminating circuit switched signaling services at the expense of a successful handling of the terminating circuit switched signaling service for the above described use case.

In particular, the described embodiments may also represent a superior solution compared to an approach in which the first control node may reject the signaling information and may request, from the source or a different entity in the mobile network, to redirect the signaling information to the second control node. Such an approach may impact the signaling service itself and/or a source of the signaling service whereas the described embodiments might not impact a legacy terminating circuit switched signaling service and changes in the service might not be visible for a subscriber of the service.

In particular, the described embodiments might beneficially not impact the terminal, since the second control node may use conventional procedures for handling the terminating circuit switched signaling service to the terminal. Such procedures may be similar to procedures used in a case in which the control node may receive the signaling information and the request for location update from the terminal.

In particular, the described embodiments might not impact a subscriber database associated with the subscriber of the terminal. Such a subscriber database may correspond to a Home Location Register.

In the following, further embodiments of the method performed by the first control node will be described. It is noted that these embodiments also apply to embodiments referring to the method performed by the second control node, embodiments referring to the first control node, embodiments referring to the second control node, embodiments referring to the computer program, and embodiments referring to the mobile network.

In particular, the first control node may be distinct from the second control node.

In particular, considering the direction of the sent signaling information, the first control node may represent an original control node and the second control node may represent a gateway control node. Alternatively or additionally, the first control node may present a source control node and the second control node may represent a target control node.

In particular, the first control node and the second control node may be embodied as Mobile Switching Center Server. The first and/or second control nodes may comprise or may be co-located with another logical network element, particularly a Visitor Location Register (VLR). Additionally or alternatively, the first and/or second control nodes may comprise or may be co-located with another logical network element, particularly a Media Gateway (MGW).

In particular, the signaling information received by the first control node may comprise a request for terminating the terminating circuit switched signaling service and/or information necessary for the signaling service, for example address information of the source of the signaling service.

In particular, the signaling information received by the first access node may be comprised in a Provide subscriber location message or may be embodied as such a message. Further message types may be also conceivable.

In particular, the signaling service may be directed to a mobile subscriber associated with, for example using, the terminal. The signaling service may address the subscriber by employing an International Mobile Subscriber Identity (IMSI) or a Mobile Station International Subscriber Directory Number (MSISDN) of the subscriber, whereas a terminal may be usually addressed by an International Mobile Station Equipment Identity (IMEI) thereof.

In particular, the request for location update may comprise or may represent a request for updating a location of the subscriber associated with the terminal.

The method may further comprise, particularly subsequent to the step of forwarding the received signaling information, establishing a signaling relay between the source of the terminating circuit switched signaling service and the second control node.

The method may further comprise receiving address information of the second control node in the mobile network during the step of detecting, wherein the step of forwarding the received signaling information may be performed based on the received address information of the second control node in the mobile network. The address information may be called in FIGS. 1 and 2 "Second MSC/VLR address".

The step of detecting may comprises receiving, from the second control node, a request for identifying the subscriber associated with the terminal, particularly a Send Identification message. This request may be sent from the second control node to the first control node in a case in which the request for the location update may comprise a Temporary Mobile Subscriber Identity (TMSI) of the subscriber and the second control node may include the TMSI in the request sent to the first control node to obtain the IMSI of the subscriber associated with the terminal from the first control node. In such a case an involvement of a subscriber database associated with the subscriber of the terminal might not be needed however, can be optionally performed for example for authorization of the signaling forwarding by the first control node. In particular, the subscriber database may be embodied as a Home Location Register (HLR).

In particular, the address information may be received together with the request for identifying the subscriber in one message, whereby a resource saving implementation of the respective signaling exchange may be enabled.

Additionally or alternatively, the step of detecting may comprise receiving, from the subscriber database associated with the subscriber of the terminal, a request for location cancelling, particularly a Cancel Location message. In particular, the request for location cancelling may comprise or may represent a request for cancelling a location of the subscriber associated with the terminal. In this respect, the subscriber database may cancel the location of the subscriber by updating a location of the subscriber in the subscriber database, since the subscriber may now attempt to register in the second control node. The first control node may then accordingly cancel the location of the subscriber in the first control node by deleting the corresponding information in the first control node. The latter measure may apply to a case in which the request for location updating may comprise the IMSI of the terminal and in which the request for identifying the subscriber of the terminal may be omitted, i.e. not sent. Further, the second control node may send, prior to the sent request for location cancelling, a further request for location update to the subscriber database, particularly a Location Update message.

Figure 2:
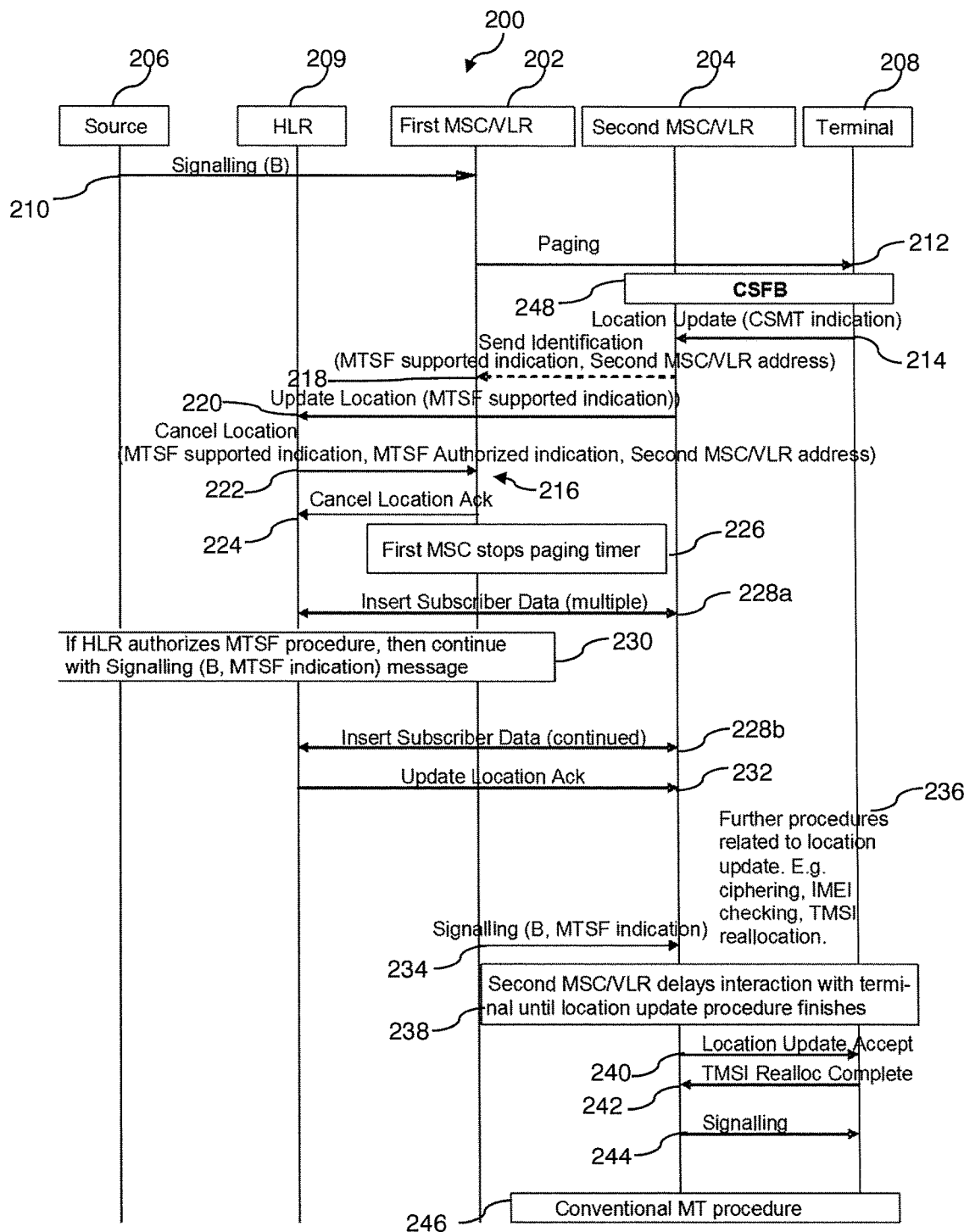
FIG. 2 is a flow diagram illustrating a method of handling a terminating circuit switched signaling service to a terminal in a mobile network according to another embodiment.

The method may further comprise, particularly during the step of detecting, receiving a support indication indicative of the second control node supporting forwarding of the signaling information particularly from the first control node to the terminal, wherein the step of forwarding the received signaling information is performed based on the received support indication. The support indication may be received together with the request for identifying the subscriber associated with the terminal in one message and/or may be received together with the request for location cancelling in one message. In the latter case, the support indication may be sent from the second control node to the first control node together with the further request for location update in one message. With reference to FIGS. 1 and 2, the support indication may be called "MTSF supported indication", wherein MTSF corresponds to Mobile Terminating Signaling Forwarding.

The method may further comprise receiving, from the subscriber database and particularly during the step of detecting, an authorization indication indicative of the subscriber database having authorized the forwarding of the received signaling information by the first control node particularly from the source to the second control node, wherein the step of forwarding the received signaling information may be performed based on the received authorization indication. The authorization indication may be received together with the request for location cancelling and/or the support indication and/or the address information in one message. With reference to FIGS. 1 and 2, the support indication may be called "MTSF Authorized indication".

The method may further comprise receiving, from the subscriber database and particularly during the step of detecting, a non-prohibition indication indicative of the forwarding of the received signaling information by the first control node particularly from the source to the second control node not being prohibited, wherein the step of forwarding the received signaling information may be performed based on the received non-prohibition indication.

In particular, an involvement of the subscriber database in the signaling forwarding by the first control node by means of explicitly authorizing the signaling forwarding by the first control node and sending the respective authorization information or by means of explicitly not prohibiting the signaling forwarding by the first control node and sending the respective non-prohibition information may be optional regarding the embodiments related to the step of detecting and/or the embodiments related to the support indication of the second control node.

In particular, additionally or alternatively to the latter measure, the subscriber database may receive the address information of the second control node from the second control node and may forward the address information to the first control node for enabling the first control node to forward the signaling information to the correct destination.

In particular, the subscriber database might not, particularly during the step of detecting, send any information related to the signaling procedure, for example at least one information selected from the group of the authorization indication, the non-prohibition information, and the address information of the second control node, wherein the step of forwarding the received signaling information may be performed by the first control node independently of an involvement of the subscriber database related to these information or any involvement of the subscriber database at all in the signaling forwarding by the first control node.

In particular, the subscriber database may be beneficially involved in the method in roaming cases, i.e. in cases in which the terminal may roam from its home network to its visited network, and the home network or home operator associated with the home network may desire to control to which control node in its network a signaling forwarding may be allowed. For example, the latter case may relate to, for example, regional services to be provided with the subscriber or the terminal. Additionally or alternatively, the subscriber database may be beneficially involved in the method, in order to enable that the termination of the circuit switched signaling to the terminal may also work in a case in which no TMSI of the terminal may be available.

In particular, the subscriber database might be beneficially not involved in the method in a case in which signaling forwarding may be employed in a visited network, for example in control nodes of the visited networks such as MSCs, without implying any changes in the home network, for example in the subscriber database of the home network such as the HLR.

The step of forwarding the received signaling information may be performed, if the first control node may support forwarding the received signaling information and optional signaling information to be formed or forwarded when the signaling relay may be established.

The method may further comprise sending an individual forward indication together with the forwarded signaling information in a message, the forward indication being indicative of the forwarded signaling information being forwarded by the first control node to the second control node. The forward indication may be embodied as a flag accordingly set. The forward indication may be called in FIGS. 1, 2 "MTSF indication". This measure may enable a direct and clean way of indicating on an application level that the signaling information may have been forwarded by the first control node.

The method may further comprise, particularly subsequent to the step of forwarding the received signaling information, forwarding further signaling information related to or of the terminating circuit switched signaling service to the second control node and/or the source of the terminating circuit switched signaling service. To this end, the first control node may use the established signaling relay. Hence, the first control node may act as a bi-directionally operating signaling relay between the source and the second control node.

The circuit switched signaling service may comprise or may be a mobile terminating location request procedure or service, particularly a Mobile Terminating Location Request (MT-LR) service or a network initiated signaling service, particularly a Network (NW) Initiated signaling service. The latter may comprise or may be Location Services or an Unstructured Supplementary Service Data (USSD) service.

The method may further comprise, prior to the step of detecting, sending a request for paging the terminal to a circuit switched access of the mobile network. An access node of a respective circuit switched radio access network may than page the terminal. Therefore the described method may leverage potential interferences which would potentially negatively impact a subscriber of the terminal in the case in which the terminal may roam, particularly physically move, in one circuit switched radio access network of the mobile network or between two different circuit switched radio access networks of the mobile network during the time the signaling information may be received at the first control node. Such a case may correspond to the terminal not performing a circuit switched fall back procedure.

The method may further comprise, prior to the step of detecting, sending a request for paging the terminal to a packet switched control node of the mobile network. The terminal may be then paged by the packet switched control node. In particular, the terminal may be attached via a Gs-interface between, particularly a packet switched core network domain associated with, a radio access network in which the terminal may supposingly be located and the first control node, particularly a MSC, or may be attached via a SGs-interface between, particularly a packet switched core network domain associated with, a or the radio access network and a control node, particularly a Mobility Management Entity (MME). In parallel, the terminal may be registered in the first control node via a circuit switched access. The terminal may perform a location update to the second control node particularly embodied also as a MSC which may be the control node having not the SGs association and having not initiated the paging for the terminal. Such a case may happen at circuit switched fallback, for example in a case in which a Location Area (LA) and a Tracking Area (TA) might not cover exactly the same geographical area, for example since the LA and the TA may use different frequency bands for transmission.

In particular, the embodiment directed to the signaling information being comprised in the Provide subscriber location message or being embodied as such a message may be applicable when the terminal may perform the circuit switched fallback procedure or not performing the circuit switched fallback procedure.

In the following, further embodiments of the method performed by the second control node will be described. It is noted that these embodiments also apply to embodiments referring to the method performed by the first control node, embodiments referring to the first control node, embodiments referring to the second control node, embodiments referring to the computer program, and embodiments referring to the mobile network.

The second control node may be capable of recognizing the signaling information to be forwarded by looking into lower signaling layers in order to identify a source of the signaling information.

The request for the location update may comprise a circuit switched fallback indication indicative of the request for location update is due to the terminal having changed from a packet switched access of the mobile network to a circuit switched access of the mobile network, wherein the method may further comprise keeping a signaling connection or link to the terminal for a predetermined time period. The circuit switched fallback indication may indicate to the second control node to not terminate the signaling connection such that the location update procedure for the subscriber of the terminal might not be finished prior to the forwarded signaling information being received by the second control node. The circuit switched fallback indication may be embodied as a flag. The circuit switched fallback indication may be similarly defined or may be identical to the CSMT flag as described in TS 23.272 V11.3.0 (2012-12) used for circuit switched calls. The circuit switched fallback indication is referred to in the description of the FIGS. 1 to 4 as "CSMT flag", wherein CSMT corresponds to Circuit Switched fallback Mobile Terminated signaling service.

The method may further comprise receiving, from the terminal, further signaling information related to an originating circuit switched signaling service, determining whether the originating signaling service may be related to the terminating circuit switched signaling service, and sending the further signaling information related to the originating circuit switched signaling service to a further node of the mobile network, the further node being distinct from the first control node, if the originating signaling service might not be related to the terminating signaling service and else sending the further signaling service to the first control node. Therefore the first control node may act as signaling relay for nested signaling services but may not be involved in the transmission of the signaling information for independent originating signaling services.

In particular, the step of determining may be performed if the forward indication may be available or received by the second control node. Further, the step of determining may be performed subsequent to the receipt of the forwarded signaling information by the second control node.

The method may further comprise receiving, from a node distinct from the first control node, further signaling information related to a further terminating circuit switched signaling service, determining whether the second control node may be capable of handling or controlling the terminating circuit switched signaling service and the further terminating circuit switched signaling service in parallel to one another, and handling the terminating circuit switched signaling service and the further circuit switched signaling service in parallel to one another, if the second control node may be capable of handling the terminating circuit switched signaling service and the further terminating circuit switched signaling service in parallel to one another, and else rejecting the further signaling information related to the further terminating circuit switched signaling service.

In particular, the step of determining may be performed by the second control node subsequent to the second control node having received a location update acknowledgment from the subscriber database.

In the following, further embodiments of the first and second control nodes will be described. It is noted that these embodiments also apply to embodiments referring to the method performed by the first control node, embodiments referring to the method performed by the second control node, embodiments referring to the computer program, and embodiments referring to the mobile network.

The first control node may be adapted to perform one or more steps of the above described method performed by the first control node.

The second control node may be adapted to perform one or more steps of the above described method performed by the second control node.

In another embodiment, when a first control node embodied as a MSC, after reception of signaling information for terminating a CS signaling service to a terminal detects, that a terminal has performed a LU to a second MSC, the first MSC forwards the CS signaling information to the second MSC and continues to act as signaling relay for the signaling procedure of the terminating signaling service. The terminating circuit switched signaling service is distinct from a voice call or circuit switched call. The second MSC receives the signaling information from the first MSC and interacts as needed with the terminal. Details of how the interaction with the terminal may look like may depend on the actual signaling service and is not relevant for understanding the principles of the embodiment.

The above embodiment is applicable in a case in which the terminal changes the service area of the first MSC to a service area of the second MSC at a CSFB, for example the terminal roams from a packet switched radio access network, for example LTE, to a circuit switched capable radio access network, for example UTRAN or GERAN. The above embodiment is also applicable in a case in which the terminal remains circuit switched attached to the mobile network. In the latter case the terminal may roam within one circuit switched capable radio access network of the mobile network associated with the first and second MSC, for example GERAN, UTRAN, or between different circuit switched capable access networks, for example GERAN, UTRAN, with the first radio access network being associated with the first MSC and the second radio access network being associated with the second MSC.

Referring to FIG. 1, a method for handling a terminating CS signaling service to a terminal in a mobile network according to another embodiment will be described in the following. A mobile network 100 comprises a CS capable radio access network, for example GERAN or UTRAN. A core network of the mobile network comprises a first control node 102 embodied as a MSC and a second control node 104 embodied as a second MSC different from the first MSC 102. A source 106 is initiating a CS signaling service towards a terminal 108 which is roaming within the radio access network. The source 106 represents an A-party of the CS signaling service, and may be embodied as a server. The terminal 108 to which the CS signaling service is to be delivered represents a B-party of the CS signaling service. Upon roaming, the terminal 108 changes a service area of a first MSC 102 to the service area of the second MSC 104 during the CS signaling service is to be set-up towards the terminal 108. The mobile network 100 may further comprise a subscriber database embodied as a Home Location Register (HLR) 109.

In a first step 110 of the method, the first MSC 102 receives a request for terminating the CS signaling service to the terminal 108. The request is part of a signaling message labeled in FIG. 1 as "Signaling (B)" and comprises identification information of the terminal 108 labeled in FIG. 1 as "B". Thereupon, in a next step 112, the first MSC 102 sends a request for paging the terminal 108. Simultaneously, the terminal 108 moves to the service area of the second MSC 104 and performs, in a step 114, a LU procedure to the second MSC 104. The LU procedure is performed using a TMSI of the subscriber using the terminal 108.

In a next step 116, the first MSC 104 detects that the terminal 108 has changed to the service area of the second MSC 104 in that the first MSC 104 receives a Send Identification message from the second MSC 104. The received message comprises a support indication indicative of the second MSC 104 supporting Mobile Terminating Signaling Forwarding (MTSF) for signaling information received from another control node, for example the first control node 102, to a terminal 108, and address information of the second MSC 104 in the mobile network 100. The support indication is labeled in FIG. 1 as "MTSF supported indication", and the address information is labeled in FIG. 1 as "Second MSC/VLR address". Upon receiving the Send Identification message, the first MSC 192 stores the extracted address information of the second MSC 104 such that the first MSC 102 is enabled to later forward the received signaling information of the "Signaling" message to the correct destination, namely the second MSC 104.

In case that the request for the LU procedure has been sent by the terminal 108 using an IMSI, the described Send Identification message and the associated Send Identification procedure performed in first MSC 102 and the second MSC 104 will be omitted. The step 116 of detecting, performed by the first MSC 102, that the terminal 108 has requested a location update and thus has changed to the service area of the second MSC 104 is performed by the first MSC 102 receiving a request for location cancelling labeled in FIG. 1 as "Cancel Location", as will be described later.

In a next step 120, the second MSC 104 sends, to the HLR 109, a request for updating the HLR associated with a location area of the subscriber, which request is sent in response to the request for LU received from the terminal 108. The sent request is embodied as an Update Location message and is accordingly labeled in FIG. 1, and comprises the support indication "MTSF supported indication". The support indication is optionally included in the Update Location message, and can be included in case in which the HLR 109 can be to be requested to be involved in the described signaling forwarding procedure or in a case in which it may be indicated to the HLR 109 that the involvement of the HLR 109 in the signaling procedure is needed. In this case, the HLR 109 may perform, for example, authorization of the MTSF procedure to be later performed, or may, for example, provide the address information of the second MSC 104 to the first MSC 102 when the Send Identification message was not sent. To this end, the address information may have been included in the Update Location message sent from the second MSC 104 to the HLR 109.

In a next step 122, the HLR 109 sends the above mentioned Cancel Location message to the first MSC 102, which may include, depending on the above described embodiments, the support indication of the second MSC 104, an authorization indication indicative of the HLR 109 having authorized that the MTSF procedure can be performed by the first MSC 102, and the address information of the second MSC 104. In response to receiving the Cancel Location message, the first MSC sends 102, as acknowledgment, particularly in a step 124, a Cancel Location Ack message to the HLR 109.

If the HLR 109 has authorized the MTSF procedure and or if the HLR 109 has not sent any MTSF related data, for example, depending on the embodiment at least one of the information of the group selected from the authorization indication, the support indication of the second MSC 104 and the address information of the second MSC 104, the first MSC 102 stops in a subsequent step 126 a paging timer used to indicate a valid period for repeatedly sending paging request to the terminal 108. In addition to the later, the first MSC 102 performs in this step 126 also necessary determinations like checking a roaming restriction.

In one or more subsequent steps 128a, 128b, subscriber data of a subscriber associated with the terminal 108 are sent from the HLR 109 to the second MSC 104 and the sending thereof is accordingly acknowledged by the second MSC 104 to the HLR 109. For illustration purposes, only two steps 128a, 128b are depicted in FIG. 1 with the corresponding information exchange being labeled by "Insert Subscriber Data (multiple)" and "Insert Subscriber Data (continued)". However, it is to be understood that multiple messages may be used for the respective information exchange. The above explained authorization by the HLR 109 may be depicted in FIG. 1 by a reference numeral 130. In a next step 132, the HLR 109 acknowledges the Update Location request to the second MSC 104 by sending a respective Update Location Ack message to the second MSC 104.

Thereupon, the first MSC 102 forwards in a next step 134 the signaling information for terminating the CS signaling service to the second MSC 104. The request is labeled in FIG. 1 by "Signaling (B, MTSF indication)", and comprises a forward indication which is added to the signaling information received previously and which indicates that the currently sent request represents signaling data of a forwarded type. The forward indication is labeled in FIG. 1 by "MTSF indication".

The second MSC/VLR 104 may perform in additional steps 136 further procedures related to the LU procedure, for example ciphering, IMEI verifying labeled in FIG. 1 by "IMEI checking" or TMSI reallocation. These steps 136 may be performed at any stage between the receipt of the Location Update message by the second MSC 104 and a later described sending of the Location Update Accept message sent by the second MSC 104.

In a subsequent step 138, the second MSC 104 delays an interaction with the terminal 108 until the LU procedure is finished. In a next step 140, the second MSC 104 accepts the request for LU sent by the terminal 108 by sending the Location Update Accept message to the terminal 108. Thereupon, the terminal 108 sends a TMSI Reallocation Complete message to the second MSC 104, in order to complete the reallocation of the TMSI. The request for terminating the CS signaling service is then forwarded to the terminal 108 in a subsequent step 144, which request is included in a signaling message labeled in FIG. 1 "Signaling". In a next step 146, a conventional MT procedure is performed.

The first MSC 102 stays in the signaling path for the CS signaling service being terminated to the terminal 108 as described with reference to FIG. 1. The first MSC 102 continues during the established CS signaling service to serve as a signaling relay node between the source 106 or originator of the CS signaling service and the second MSC 104 for relaying signaling data of the CS signaling service to the second MSC 104. In turn, the second MSC 104 interacts with the terminal 108 as required for the established terminating CS signaling service, and uses the first MSC 102 as signaling relay for the established terminating CS signaling.

The forward indication may be used by the second MSC 104, in order to correctly handle the forwarded signaling request and the signaling information of the terminated signaling service by sending them to the terminal 108. Additionally or alternatively, the second MSC 104 may use the received forward indication to handle further signaling information for further originating and/or terminating CS signaling services correctly.

For example, the second MSC 104 might not send later received signaling information for an originating CS service via the first MSC 102 if the originated CS signaling service is not nested with the terminating CS signaling service, but send the signaling information of the originating CS signaling service directly to a respective destination. Further, the second MSC 104 may send later received signaling information for an originating CS signaling service via the first MSC 102 if the originated CS signaling service is nested with the terminating CS signaling service. The second MSC 104 may first determine whether the forward indication is available in the second MSC 104 and/or has been previously been received. If the first determination is in the affirmative, the second MSC 104 may then secondly determine whether the originating signaling service and the terminating signaling services are nested. If the first determination is not in the affirmative, the second determination may not be performed. The first determination can also be omitted. The path of the sent signaling information of the originating CS signaling service depends on the result of the second determination.

In another example, the second MSC 104 may receive signaling information for a different terminating CS signaling service which reaches the second MSC 104 directly, i.e. without signaling information thereof passing the first MSC 102, and which has to be handled in parallel to the terminating CS signaling service. In such a case, the second MSC 104 may firstly determine whether the forward indication is present in the second MSC 104 and/or has been previously been received and, if this first determination is in the affirmative, secondly determines whether the terminating CS signaling service and the further terminating CS signaling service may be handled by the second MSC 104 in parallel to one another. If the latter second determination is in the affirmative, the terminating CS signaling service and the further terminating CS signaling service will be handled in parallel, and else the further terminating CS signaling service will be rejected. If the first determination is not in the affirmative, the second determination may not be performed. The first determination can also be omitted.

Referring to FIG. 2, a method for handling a CS terminating signaling service to a terminal in a mobile network according to another embodiment will be described. The mobile network 200 is similar to the mobile network 100 and further comprises a packet switched radio access network such as LTE. The method of FIG. 2 is similar to the method in FIG. 1, however, the terminal 208 is roaming from the packet switched radio access network to the circuit switched capable radio access network, and performs a location update procedure to a second MSC 204 instead of the first MSC 202. Accordingly, the step 214 in which the request for the Location Update is sent from the terminal to the second MSC is performed subsequent to the step 212 in which the first MSC 202 pages the terminal 208. Further, the CSCF procedure for the terminal 208 in which the terminal 208 and the second MSC 204 are involved is performed between these steps 212, 214 particularly as illustrated by a reference numeral 248. Further, a circuit switched fallback indication labeled in FIG. 2 by "CSMT indication" is included in the Update Location message sent from the terminal to the second MSC. The signaling information transmitted in the step 210 may be included in a "Provide subscriber location" message or may be embodied as such a message.

The methods described with reference with FIGS. 1, 2 may be applied for terminating CS signaling services distinct from calls, wherein the MSCNLR 102, 202, to which the terminal 108, 208 sends a Location Area Update (LAU), is different from the MSCNLR 102, 202 that sent the paging message to the terminal 108, 208. In order to support MTSF for the signaling information, both the second MSC 104, 204 controlling the target cell, the first MSC 102, 202 that sent the paging message to the terminal 108, 208 and the HLR 109, 209 have to support the MTSF capability.

In order to ensure roaming forwarding for signaling information can be offered in all scenarios, for example in case of IMSI in the LAU Request from the terminal 108, 208, HLRs 109, 209 have to be updated to support MTSF as described above. In order to permit MTSF for signaling information from the first VLR associated with the first MSC 102, 202, if the HLR 109, 209 is not updated to support MTSF but the visited mobile network does support MTSF of signaling information, the second VLR associated with the second MSC 104, 204 may include the "MTSF supported indication" or flag in the Send Identification when it receives a Location Updating Request message comprising the "CSMT indication".

Main differences of the method described in FIG. 2 compared to a Mobile Terminating Roaming Forwarding (MTRF) procedure defined in TS 23.018 V11.3.0 (2012-06) are as follows:

The paging message in LTE triggers the circuit switched fallback, which is followed by a location update in the new radio access network. This functionality is already supported in the circuit switched fallback signaling flows for terminating calls and no additional functionality is necessary.

The terminal 108, 208 includes the "CSMT indication" in the location update request message such that the signaling link is maintained for longer in case the signaling message is delayed by the first MSCNLR 102, 202.

If the Location Update Request message contains the "CSMT indication" set and a valid TMSI/old Location Area Identity (LAI), the second MSC/VLR 104, 204 may indicate to the first MSCNLR 102, 202 that it supports MTSF in the Send Identification message. The second VLR then performs authentication to the Location update and updates the Home Subscriber Server (HSS) or the HLR. If the Location Update Request contains the IMSI, only HLR-based MTSF procedure can be used.

After the Cancel Location message is received from the HSS or the HLR, if the HLR 109, 209 authorized the MTSF service between the first and the second terminating MSCs 102, 104, 202, 204, or if the HLR 109, 209 did not disallow the MTSF procedure between the first and the second terminating MSCs 102, 104, 202, 204 but the second MSCNLR 104, 204 indicated its MTSF support earlier in the Send Identification message, the first MSCNLR 102, 202 stops paging timer and for terminating CS signaling other than calls, the first MSCNLR 102, 202 performs needed checks, and then forwards the CS signaling to the second MSCNLR 104, 204, indicating to the second MSCNLR 104, 204 that this is forwarded signaling. The first MSCNLR 102, 202 stays in the signaling path and continues as a relay signaling node between the source 106, 206 or originator of the CS service and the second MSC 104, 204. The second MSCNLR 104, 204 interacts with the terminal 108, 208 as required for the terminating CS signaling, and uses the first MSC/VLR 102, 202 as signaling relay for this terminating CS signaling.

Figure 3:
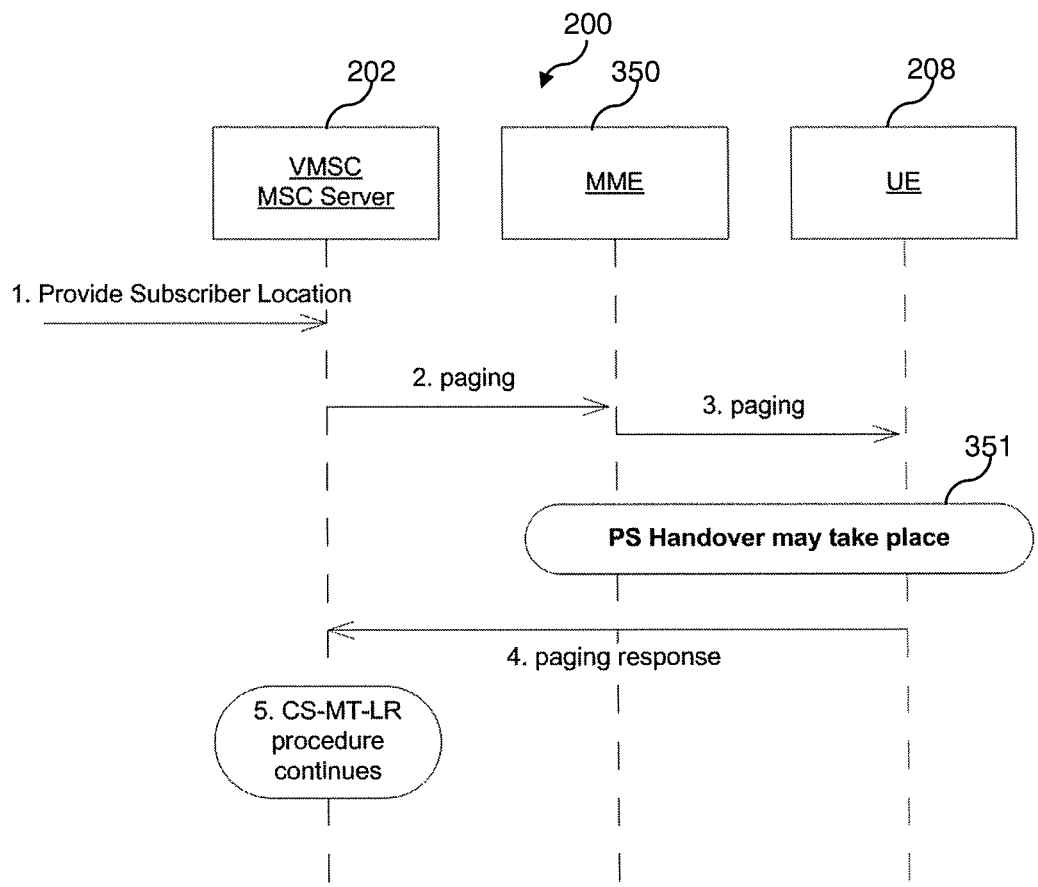
FIG. 3 is a flow diagram illustrating a signaling exchange performed in association with a signaling exchange of the method in FIG. 2.
Figure 4:
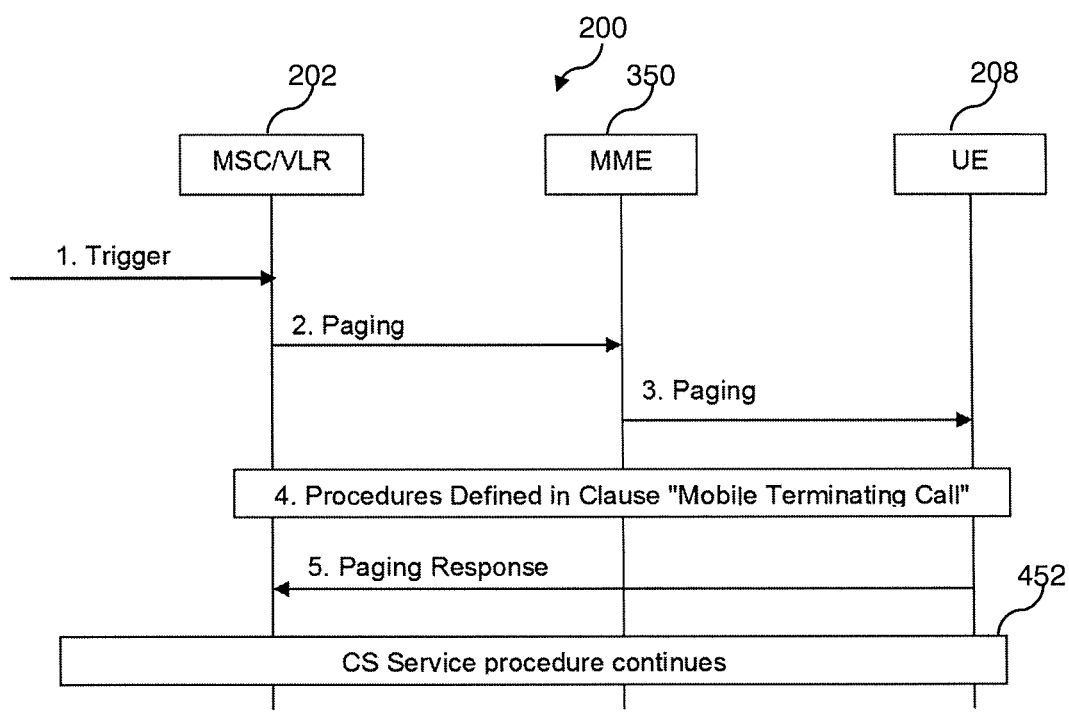
FIG. 4 is a flow diagram illustrating another signaling exchange performed in association with the signaling exchange of the method in FIG. 2.

Referring to FIGS. 3, 4, first and second examples will be described in which the method of FIG. 2 is imbedded. The mobile network 200 further comprises a packet switched control node 350 in the core network, which control node 350 is embodied as a MME and is associated with the packet switched radio access network. It is noted that the terminal 208 is labeled in these Figures by "UE".

In the first example illustrated in FIG. 3, a MT-LR procedure for the terminal 208 being not in an Internet Protocol (IP) Multimedia Subsystem (IMS) Voice over IP (VoIP) session is performed. For completeness, the abbreviation "VMSC" in FIG. 3 may refer to Visited MSC in which a subscriber associated with a roaming terminal may be registered.

In a first step 1, the first MSC 202 receives a PROVIDE_SUBSCRIBER_LOCATION message due to CS-MT LR, as is described in TS 23.271, e.g. V11.1.0 (2012-12), clause 9.1.2. In a subsequent step 2, the first MSC 202 sends a Paging message to a MME 350 which comprises a LCS Client Identity, and a LCS indicator. In a next step 3, if the MME 350 did not return the "SMS-only" indication to the UE 208 during Attach or Combined TA/LA Update procedures, the MME 350 thereupon sends a Paging message to the terminal 208. This message comprises parameters as specified in TS 23.401, e.g. V11.4.0 (2012-12), a CN Domain Indicator, a LCS Client Identity, and a LCS indicator. The LCS indicator is used to inform the terminal 208 that this paging is for MT-LR request. The LCS Client Identity and the LCS indicator are only included in the CS Page message, if the terminal 208 is in an active mode. If the MME 350 returned the "SMS-only" indication to the terminal 208 during Attach or Combined TA/LA Update procedures, the MME 350 will not send the Paging message to the terminal 208, and the MME 350 sends a CS Paging Reject message towards the first MSC 202 to stop the CS Paging procedure and this CSFB procedure stops.

In a next step 4, if the LA of the new cell is different from the one stored in the terminal 208, the terminal 208 initiates a Location Area Update (LAU) procedure. Service based redirection/reselection or PS Handover may take place as indicated by the step labeled by "CSFB" in FIG. 2. The terminal 208 includes a circuit switched fallback indication referred to in the following as "CSMT flag" in the location update request message such that the signaling link is maintained for longer in case the terminal 208 performs an Update Location to a new MSC, for example the second MSC 204. The CSMT flag represents a flag in a LA update request message and is used in CS fallback for a MT call or another CS signaling service, in order to keep the signaling connection between the terminal 208 and the second MSC 204. If the terminal 208 does not initiate a LAU procedure, the 208 terminal responds with a Paging Response message to the first MSC 202. Service based redirection/reselection or PS Handover may take place as is indicated in the step 351 which may be labeled by "CSFB" in FIG. 2. The PS Handover may take place in parallel to the CSFB procedure or subsequent to the CSFB procedure.

In a next step 5, after performing a successful LAU procedure or after receiving the Paging Response, the first MSC 202 continues with the CS-MT LR procedure as defined in TS 23.271, e.g. V11.1.0 (2012-12), clause 9.1.2.

In a first alternative to the latter step 5, if the first MSC 202 receives a Cancel Location instead of a Location Update request or a Paging_Response in the above described step, then the first MSC 202 does not continue the CS-MT procedure and the first MSC 202 replies to the PROVIDE-SUBSCRIBER_LOCATION message that the subscriber is not identified. Accordingly the terminating CS signaling service is rejected. The latter may trigger or initiate that the Gateway Mobile Location Centre (GMLC) interacts again with the HLR 209 to fetch the serving MSC number. In this case the terminating CS signaling service can be redirected to the second MSC 204. In a second alternative, the first MSC 202 forwards the CS-MT-LR procedure to the second MSC 204 as is described with reference to FIG. 2.

In the second example illustrated in FIG. 4, NW-Initiated CS Services are performed.

In a first step 1, the first MSCNLR 202 receives a trigger for a NW-Initiated CS procedure. In a next step 2, the first MSCNLR 202 sends a Paging message to the MME 350. For a call independent supplementary service, the Paging message may include the SS service ID. In a next step 3, if the MME 350 did not return the "SMS-only" indication to the terminal during Attach or Combined TA/LA Update procedures, the MME 350 sends a Paging message to the terminal 208. This message comprises parameters as specified in TS 23.401, e.g. V11.4.0 (2012-12), and a CN Domain indicator. For call independent supplementary service the Paging message may include the SS service ID. The SS service ID is used to indicate the type of the supplementary service, for example USSD, to the terminal 208. The SS service ID is only included in the CS Page message, if the terminal 208 is in an active mode. If the MME 350 returned the "SMS-only" indication to the terminal 208 during Attach or Combined TA/LA Update procedures, the MME 350 will not send the Paging message to the terminal 208, and the MME 350 sends a CS Paging Reject message towards the first MSC 202 to stop the CS Paging procedure and this CSFB procedure stops.

In a next step 4, if the LA of the new cell is different from the one stored in the terminal 208, the terminal 208 shall initiate a Location Area Update procedure. Service based redirection/reselection or PS Handover may take place as is indicated by the step 248 labeled "CSFB" in FIG. 2. The terminal 208 includes the CSMT flag in the location update request message such that the signaling link is maintained for longer in case the terminal performs Update Location to a new MSC, for example the second MSC 204. If the terminal 208 does not initiate a LAU procedure, the terminal 208 responds with a Paging Response message to the first MSC 202. Service based redirection/reselection or PS Handover may take place as is indicated by the step 248 labeled "CSFB" in FIG. 2.

In a next step 5, after performing a successful LAU procedure or after receiving the Paging Response the first MSC 202 continues the applicable CS procedure, e.g. for Supplementary Service as specified in specifications such as TS 23.090 e.g. V11.0.0 (2012-09). If the first MSC 202 receives a Cancel Location message instead of a Location Update request or a Paging_Response message in the step 4, then the first MSC 202 proceeds according to two alternatives described in the following.

In the first alternative, the first MSC 202 does not continue the applicable CS procedure, but replies to the source 206 or originator of a NW-Initiated CS procedure in the step 1 that the subscriber is absent. Accordingly the terminating CS signaling service is rejected. The latter will trigger or initiate that the NW-Initiated CS procedure is performed again towards second MSC 204. In this case the terminating CS signaling service can be redirected to the second MSC 204.

In the second alternative, the first MSC 202 forwards the applicable CS procedure to the second MSC 204 as described with reference to FIG. 2.

It is noted that the term "MSC" used with reference to FIGS. 1 to 4 may refer to a MSC server or to a MSC server which is co-located with a VLR. Accordingly, in FIGS. 1 to 4 the MSC is labeled by "MSC/VLR". The MSC may optionally be co-located with a MGW. In the following, a method for handling a terminating circuit switched signaling service to a terminal according to a further embodiment will be explained. A mobile network 500 comprises a first control node 502, a second control node 504 and a further node 554. The first control node 502 and the second control node 502, 504 may be embodied, for example, as MSC. The method is performed by the second control node 504. The signaling service is distinct from a call. The further node 554 is distinct from the first control node 502. The further node 554 may be also embodied as control node, for example as MSC. For example, the first control node 502 may correspond to the first control node 102, 202 of FIGS. 1 to 4, and the second control node 504 may correspond to the second control node 102, 204 of FIGS. 1 to 4. Hence, the method illustrated in FIG. 5 may be combined with the methods illustrated in FIGS. 1 to 4.

The second control node 504 receives, from a terminal 508, a request for a location update. This step is not illustrated in FIG. 5. The second control node 504 then receives, in a step 534, forwarded signaling information for terminating the terminating circuit switched signaling service to the terminal 508 from the first control node 502. The singling information may comprise a forward indication explained above. In a step 544, the second control node 508 terminates, based on the received forwarded signaling information, the terminating circuit switched signaling service to the terminal 508.

Figure 5:
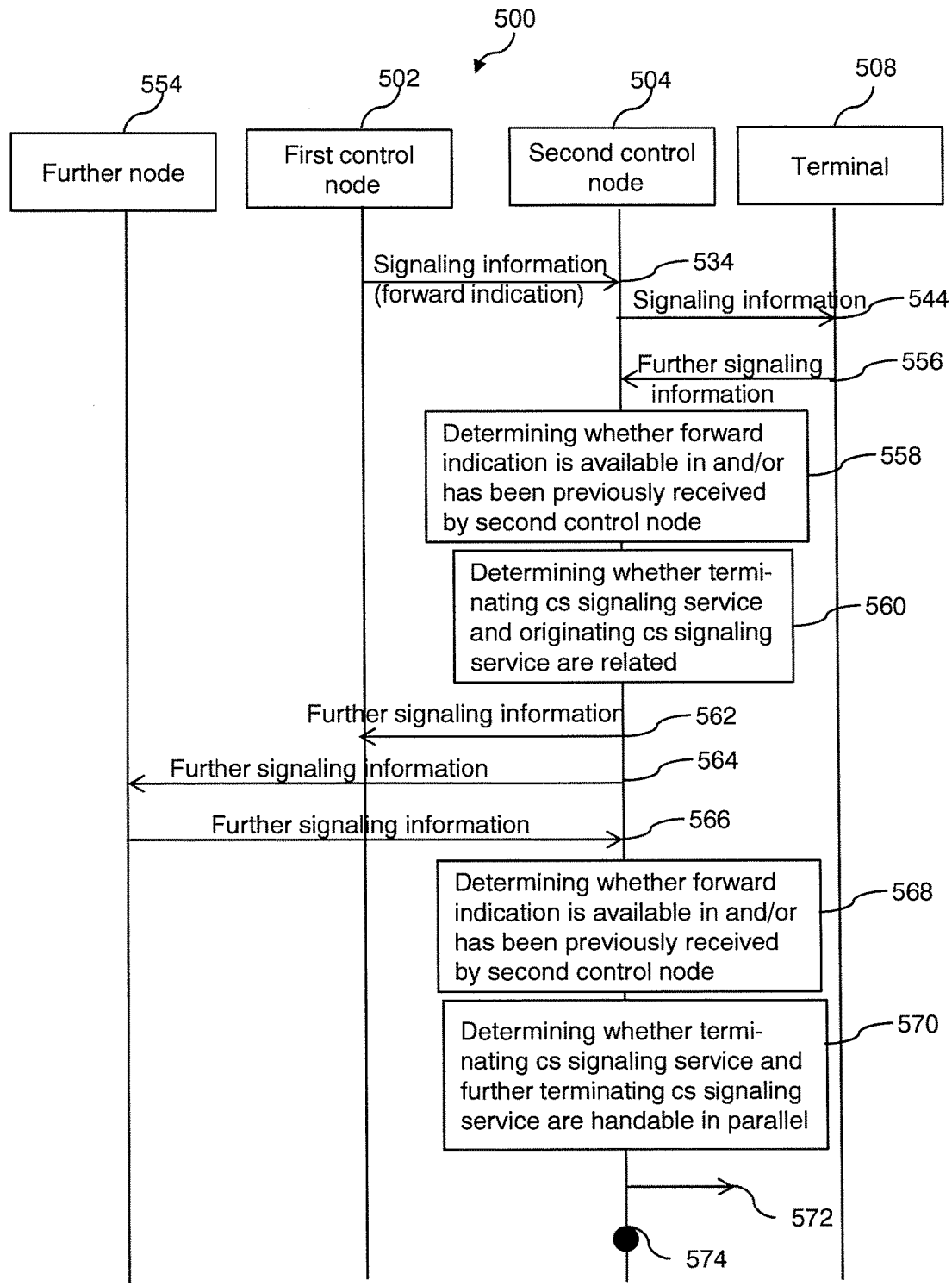
FIG. 5 is a flow diagram illustrating a method of handling a terminating circuit switched signaling service to a terminal in a mobile network according to another embodiment.

In a first option of the method, the second control node receives in a step 556, from the terminal 508, further signaling information related to an originating circuit switched signaling service. In a step 558, the second control node 504 determines whether the forward indication is available in the second control node 504 and/or has been previously received by the second control node 504. If this determination is in the affirmative, the second control node 504 determines in a step 560 whether the originating circuit switched signaling service is related to the terminating circuit switched signaling service. In FIG. 5, the abbreviation "cs" corresponds to circuit switched. If this determination is in the affirmative, the second control node 504 sends the further signaling information for the originating circuit switched signaling service to the first control node 502, as illustrated by a step 562. If the determination in the step 560 is not in the affirmative, the second control node sends in a step 564 the further singling information of the originating circuit switched signaling service to the further node 554.

If the determination in the step 558 is not in the affirmative, the method may stop or may proceed to the step 560. The step 558 may be also omitted in the method.

In a further option of the method, the second control node 504 receives in a step 566, from the node 554, further signaling information related to a further terminating circuit switched signaling service. In a step 568, the second control node 504 determines whether the forward indication is available in the second control node 504 and/or has been previously received by the second control node 504. If this determination is in the affirmative, the second control node 504 determines in a step 570 whether the second control node 504 is capable of handling the terminating circuit switched signaling service and the further terminating circuit switched signaling service in parallel to one another. If the determination is in the affirmative, the second control node 504 handles the terminating circuit switched signaling service and the further terminating circuit switched signaling service in parallel to one another, as illustrated by a step 572. If the determination is not in the affirmative, the second control node 504 rejects in a step 574 the further signaling information related to the further terminating circuit switched signaling service. To this end, the second control node 504 may send a corresponding rejection notification to the further node 554.

If the determination in the step 568 is not in the affirmative, the method may stop or may proceed to the step 570. The step 558 may be also omitted in the method.

The first and second method options can be performed in the above described sequence or in a reverse sequence. The first and second method options can also be performed separately, i.e. alone.

Figure 6:
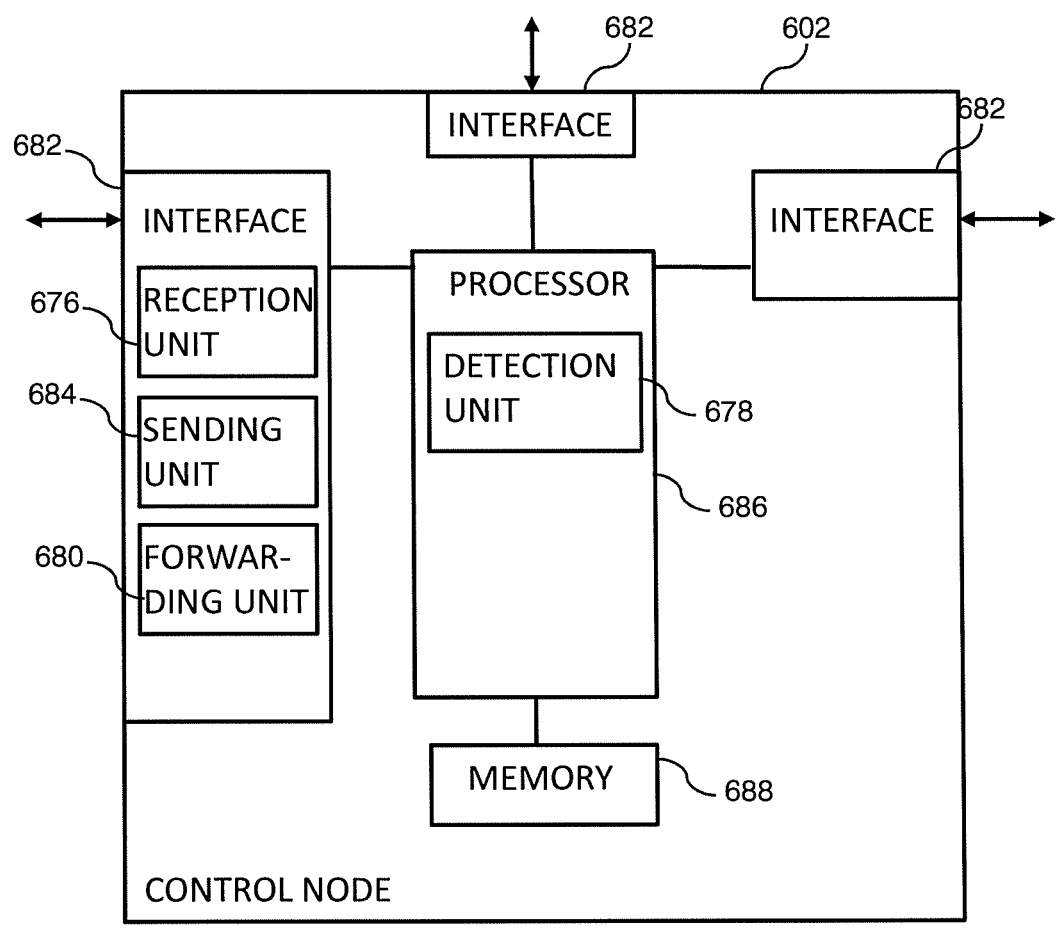
FIG. 6 is a block diagram illustrating a control node for handling a terminating circuit switched signaling service to a terminal in a mobile network according to an embodiment.

Referring to FIG. 6, a control node 602 for handling a terminating circuit switched signaling service to a terminal in a mobile network is described. The signaling service is distinct from a call. The mobile network comprises the control node 602 and another control node. The control node 602 comprises a reception unit 676 adapted to receive signaling information for terminating the circuit switched signaling service to the terminal, a detection unit 678 adapted to, subsequent to the reception of the signaling information, detect that the terminal has requested a location update from the another control node, and a forwarding unit 680 adapted to, based on the detection, forward the received signaling information to the another control node. The control node may be the first control node 102, 202, 502 described above and another control node may present the second control node 104, 204, 504 described above. The control node 602 may be adapted to perform one or more steps of the above described method performed by the first control node 102, 202, 502. To this end, the control node 602 may comprise respective functionality based units.

An interface 682 of the control node 602 comprises the reception unit 676, the forwarding unit 680 and a sending unit 684 adapted to send information related to the method performed by the control node 602. The forwarding unit 680 and the sending unit 684 may be separate units or may be integrally embodied. A processor 686 of the control node 602 comprises the detection unit 678. The control node 602 further comprises a memory 688 adapted to store information related to the method performed by the control node 602.

Figure 7:
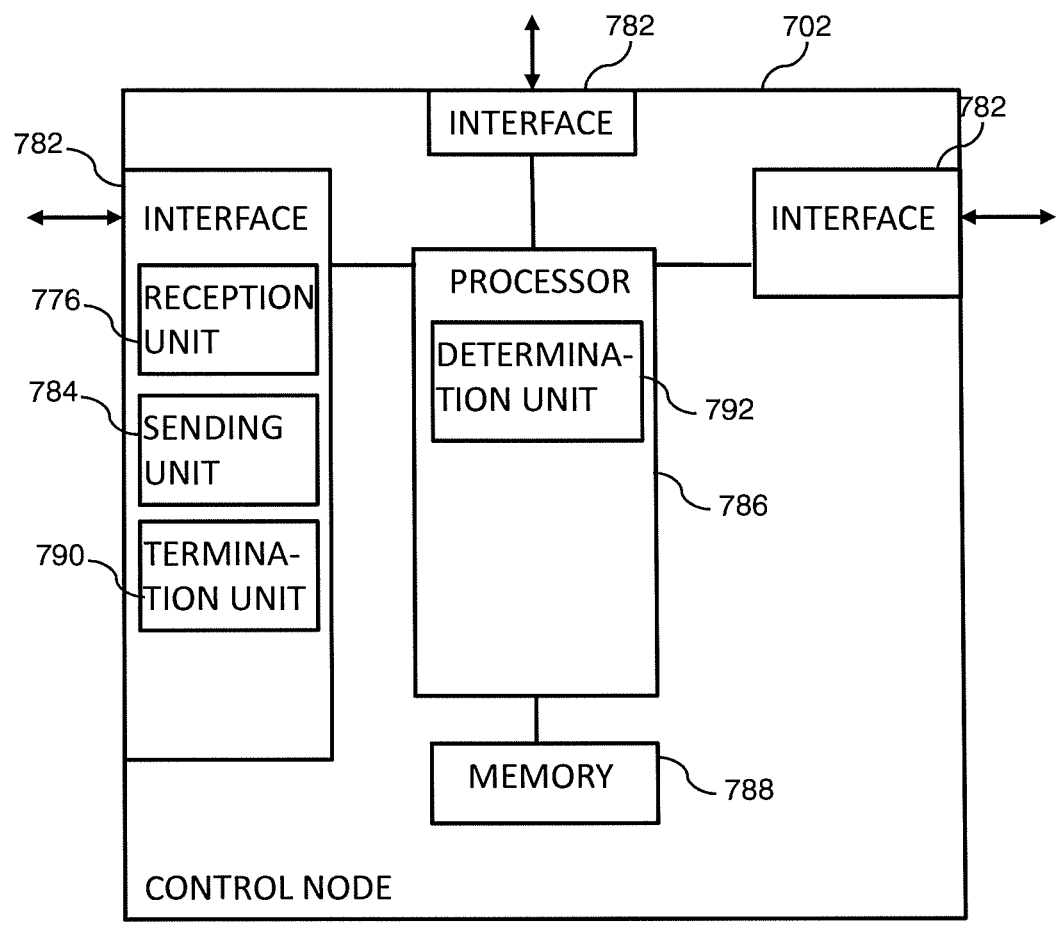
FIG. 7 is a block diagram illustrating a control node for handling a terminating circuit switched signaling service to a terminal in a mobile network according to another embodiment.

Referring to FIG. 7, a control node 704 for handling a terminating circuit switched signaling service to a terminal in a mobile network is described. The signaling service is distinct from a call. The mobile network comprises the control node 704 and another control node. The control node 704 comprises a reception unit 776 adapted to receive, from the terminal, a request for a location update, wherein the reception unit 776 is adapted to, particularly subsequent to the reception of the request for updating the location, receive, from the another control node of the mobile network, forwarded signaling information for terminating the signaling service to the terminal. The control node 704 may also comprise two separate reception units 776 implementing the latter two receiving functionalities. The control node 704 also comprises a termination unit 790 adapted to terminate, based on the received forwarded signaling information, the terminating circuit switched signaling service to the terminal. The control node 704 may be the second control node 104, 204, 504 described above and another control node may represent the first control node 102, 202, 502 described above. The control node 704 may be adapted to perform one or more steps of the above described method performed by the second control node 104, 204, 504. To this end, the control node 704 may comprise respective functionality based units.

An interface 782 of the control node 704 comprises the reception unit 776, the termination unit 790 and a sending unit 784 adapted to send information related to the method performed by the control node 704. The termination unit 790 and the sending unit 784 may be separate units or may be integrally embodied. A processor 786 of the control node 704 comprises a determination unit 792 adapted to perform determinations described above in relation with the method performed by the second control node 104, 204, 504. The control node 704 further comprises a memory 788 adapted to store information related to the method performed by the control node 704.

It is noted that an association between the physical units 682, 686, 688, 782, 786, 788 of the control node 602, 704 illustrated in FIGS. 6, 7 and the functionality based units 676, 678, 680, 684, 776, 784, 790, 792 of the control node 602, 704 illustrated in FIGS. 6, 7, respectively, may differ from the described embodiments. For example, the sending unit 684 of the control node 602 illustrated in FIG. 6 may be part of the interface 682, the processor 686, and the memory 688 of the control node 602 illustrated in FIG. 6.

Modifications and other embodiments of the present disclosure will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of handling a terminating circuit switched signaling service to a terminal in a mobile network, the signaling service being distinct from a call, the mobile network comprising a first control node and a second control node, the method comprising:
   receiving, at the first control node, signaling information for terminating the circuit switched signaling service to the terminal, wherein the received signaling information is related to the circuit switched signaling service, and wherein the circuit switched signaling service comprises a mobile terminating location request service;
   receiving, at the first control node, a message comprising:
   (i) address information of the second control node and
   (ii) support indication information indicating that the second control node supports forwarding to the terminal signaling information received from the first control node, wherein the message was transmitted by one of:
   i) the second control node and ii) a Home Location Register (HLR);

detecting, by the first control node, that the terminal has requested a location update from the second control node based on the received message; and as a result of detecting that the terminal has requested the location update, forwarding, by the first control node, the received signaling information for terminating the circuit switched signaling service to the terminal directly to the second control node based on the address information of the second control node and the support indication information.

2. The method according to claim 1, the method further comprising:

establishing a signaling relay between a source of the terminating circuit switched signaling service and the second control node.

3. The method according to claim 1, wherein the message was transmitted by the second control node in response to a location update transmitted by the terminal.

4. The method according to claim 1, wherein the message was transmitted by the HLR in response to an Update Location transmitted by the second node in response to a location update transmitted by the terminal.

5. The method according to claim 1, the method further comprising:

receiving, from the subscriber database during the step of detecting, an authorization indication indicative of the subscriber database having authorized the forwarding of the received signaling information by the first control node to the second control node, wherein the step of forwarding the received signaling information is performed based on the received authorization indication.

6. The method according to claim 1, the method further comprising:

receiving, from the subscriber database during the step of detecting, a non-prohibition indication, wherein the non-prohibition indication indicates that the forwarding of the received signaling information by the first control node to the second control node is not being prohibited, wherein the step of forwarding the received signaling information is performed based on the received non-prohibition indication.

7. The method according to claim 1, wherein the step of forwarding the received signaling information is performed, if the first control node supports forwarding the received signaling information.

8. The method according to claim 1, the method further comprising:

sending an individual forward indication together with the forwarded signaling information in a message, the forward indication being indicative of the forwarded signaling information being forwarded by the first control node to the second control node.

9. The method according to claim 1, the method further comprising:

forwarding further signaling information related to the terminating circuit switched signaling service to one or more of the second control node and a source of the terminating circuit switched signaling service.

10. The method according to claim 1, wherein the circuit switched signaling service comprises a mobile terminating location request procedure or a network initiated signaling service, wherein the network initiated signaling service comprises Location Services or an Unstructured Supplementary Service Data service.

11. The method according to claim 1, the method further comprising:

sending a request for paging the terminal to a circuit switched access of the mobile network.

12. The method according to claim 1, the method further comprising:

sending a request for paging the terminal to a packet switched control node of the mobile network.

13. A method of handling a terminating circuit switched signaling service to a terminal in a mobile network, the signaling service being distinct from a call, the mobile network comprising a first control node and a second control node, the method being performed by the second control node, the method comprising:

receiving, from the terminal, a location update request indicating that the terminal has moved out of a first service area, wherein the first service is serviced by the first control node;

sending, to the first control node, a message comprising: (i) address information of the second control node and (ii) support indication information indicating that the second control node supports forwarding to the terminal signaling information received from the first control node;

receiving, from the first control node, forwarded signaling information for terminating the terminating circuit switched signaling service to the terminal, wherein the signaling information is forwarded to the second control node based on the address information of the second control node and the support indication information, wherein the received signaling information is related to the terminating circuit switched signaling service, wherein the circuit switched signaling service comprises a mobile terminating location request service, and wherein the first control node is configured to forward the signaling information directly to the second control node as a result of detecting that the terminal has requested a location update based on the sent message; and terminating, based on the received forwarded signaling information, the terminating circuit switched signaling service to the terminal.

14. The method according to claim 13, wherein the request for the location update comprises a circuit switched fallback indication indicative of the request for location update being due to the terminal having changed from a packet switched access of the mobile network to a circuit switched access of the mobile network, the method further comprising:

keeping a signaling connection to the terminal for a predetermined time period.

15. The method according to claim 13, the method further comprising:

receiving, from the terminal, further signaling information related to an originating circuit switched signaling service;

determining whether the originating circuit switched signaling service is related to the terminating circuit switched signaling service; and if the originating signaling service is not related to the terminating signaling service, sending the further signaling information related to the originating circuit switched signaling service to a further node of the mobile network, the further node being distinct from the first control node, and, if otherwise, sending the further signaling service to the first control node.

16. The method according to claim 1, the method further comprising:
receiving, from a node distinct from the first control node, further signaling information related to a further terminating circuit switched signaling service;
determining whether the second control node is capable of handling the terminating circuit switched signaling service and the further terminating circuit switched signaling service in parallel to one another; and
if the second control node is capable of handling the terminating circuit switched signaling service and the further terminating circuit switched signaling service in parallel to one another, handling the terminating circuit switched signaling service and the further circuit switched signaling service in parallel to one another and, if otherwise, rejecting the further signaling information related to the further terminating circuit switched signaling service.

17. A first control node for handling a terminating circuit switched signaling service to a terminal in a mobile network, the signaling service being distinct from a call, the mobile network comprising the first control node and a second control node, the first control node comprising one or more processors and a non-transitory computer readable memory coupled to said one or more processors, said one or more processors configured to:
receive signaling information for terminating the circuit switched signaling service to the terminal, wherein the received signaling information is related to the circuit switched signaling service, and wherein the circuit switched signaling service comprises a mobile terminating location request service;
receive a message comprising: (i) address information of the second control node and (ii) support indication information indicating that the second control node supports forwarding to the terminal signaling information received from the first control node, wherein the message was transmitted by one of: i) the second control node and ii) a Home Location Register (HLR);
detect that the terminal has requested a location update from the second control node based on the received message; and
as a result of detecting that the terminal has requested the location update, forward the received signaling information for terminating the circuit switched signaling service to the terminal directly to the second control node based on the address information of the second control node and the support indication information.

18. A second control node for handling a terminating circuit switched signaling service to a terminal in a mobile network, the signaling service being distinct from a call, the mobile network comprising the second control node and a first control node, the second control node comprising one or more processors and a non-transitory computer readable memory coupled to said one or more processors, said one or more processors configured to:
receive, from the terminal, a location update request indicating that the terminal has moved out of a first service area, wherein the first service is serviced by the first control node;
send, to the first control node, a message comprising: (i) address information of the second control node and (ii) support indication information indicating that the second control node supports forwarding to the terminal signaling information received from the first control node;
receive, from the first control node, forwarded signaling information for terminating the signaling service to the terminal, wherein the signaling information is forwarded to the second control node based on the address information of the second control node and the support indication information, wherein the received signaling information is related to the terminating circuit switched signaling service, wherein the circuit switched signaling service comprises a mobile terminating location request service, and wherein the first control node is configured to forward the signaling information directly to the second control node as a result of detecting that the terminal has requested a location update based on the sent message; and
terminate, based on the received forwarded signaling information, the terminating circuit switched signaling service to the terminal.

19. A method for handling a terminating circuit switched signaling service to a terminal in a mobile network, the signaling service being distinct from a call, the mobile network comprising a first control node and a second control node, the method comprising:
receiving, by the first control node, signaling information for terminating the circuit switched signaling service to the terminal, wherein the received signaling information is related to the circuit switched signaling service, and wherein the circuit switched signaling service comprises a mobile terminating location request service;
receiving, by the second control node, a location update request from the terminal, wherein the location update request indicates that the terminal has moved out of a first service area, and the first service is serviced by the first control node;
receiving, by the first control node, a message comprising: (i) address information of the second control node and (ii) support indication information indicating that the second control node supports forwarding to the terminal signaling information received from the first control node, wherein the message was transmitted by one of i) the second control node and ii) a Home Location Register;
detecting, by the first control node, that the terminal has requested a location update from the second control node based on the received message;
as a result of detecting that the terminal has requested the location update, forwarding, by the first control node, the received signaling information for terminating the circuit switched signaling service to the terminal directly to the second control node based on the address information of the second control node and the support indication information;
receiving, by the second control node, the forwarded signaling information from the first control node for terminating the signaling service to the terminal; and
terminating, by the second control node, the terminating circuit switched signaling service to the terminal based on the received forwarded signaling information.

20. A computer program stored on a non-transitory computer readable medium, which, when being executed by a processor, is adapted to carry out or control a method for handling a terminating circuit switched signaling service to a terminal in a mobile network according to claim 1.

21. The method according to claim 3, wherein the message is a Send Identification message.

22. The method according to claim 4, wherein the request for location cancelling comprises a Cancel Location message.

23. The method according to claim 1, wherein
the first control node is a first Mobile Switching Center (MSC), and
the second control node is a second MSC.

24. The method according to claim 23, wherein
determining, by the first MSC, whether the received message comprises a support indication indicative of the second MSC supporting Mobile Terminating Signaling Forwarding (MTSF), and
as a result of the determination, forwards, by the first MSC, the received signaling information to the second MSC.

25. The method according to claim 24, wherein
the received message was transmitted by the second MSC in response to receiving a location update message transmitted from the terminal.

26. The method according to claim 1, wherein
the received message was transmitted by the HLR in response to receiving an update location message transmitted by the second MSC, wherein the
second MSC transmitted the update location message in response to receiving a location update message transmitted by the terminal, and
the HLR comprises a subscriber database.

27. The method according to claim 13, wherein
the first control node is a first Mobile Switching Center (MSC),
the second control node is a second MSC,
the support indication information indicating whether the second MSC supports Mobile Terminating Signaling Forwarding (MTSF), and
the message sent, by the second control node, in response to receiving the location update message, the support indication information indicating whether the second MSC supports Mobile Terminating Signaling Forwarding (MTSF).

* * * * *